(12) United States Patent
Neaves

(10) Patent No.: US 7,477,306 B2
(45) Date of Patent: Jan. 13, 2009

(54) METHOD AND APPARATUS FOR IMPROVING PIXEL OUTPUT SWING IN IMAGER SENSORS

(75) Inventor: Philip Neaves, Surrey (GB)

(73) Assignee: Micron Technology, Inc., Boise, ID (US)

(*) Notice: Subject to any disclaimer, the term of this patent is extended or adjusted under 35 U.S.C. 154(b) by 670 days.

(21) Appl. No.: 10/927,121

(22) Filed: Aug. 27, 2004

(65) Prior Publication Data

US 2006/0044412 A1 Mar. 2, 2006

(51) Int. Cl.
*H04N 5/335* (2006.01)

(52) U.S. Cl. .................................................. 348/308
(58) Field of Classification Search .............. 348/230.1, 348/301, 308, 310, 241
See application file for complete search history.

(56) References Cited

U.S. PATENT DOCUMENTS

| 5,917,547 A | * | 6/1999 | Merrill et al. ................ 348/301 |
| 7,250,970 B2 | * | 7/2007 | Shinohara .................... 348/308 |

* cited by examiner

*Primary Examiner*—Tuan V Ho
(74) *Attorney, Agent, or Firm*—Dickstein Shapiro LLP

(57) ABSTRACT

A bias readout circuit is disclosed for use in reading out a pixel of an imager system. The bias readout circuit includes a circuit portion which mirrors an output and bias transistor of a pixel to amplify an output signal produced by a pixel and increase the dynamic range of the pixel output.

16 Claims, 6 Drawing Sheets

US 7,477,306 B2

METHOD AND APPARATUS FOR IMPROVING PIXEL OUTPUT SWING IN IMAGER SENSORS

FIELD OF THE INVETION

The invention relates to imager devices and particularly to improving an output voltage swing for pixels used by image sensors.

BACKGROUND OF THE INVENTION

Various imager circuits have been proposed such as charge coupled device (CCD) arrays, complementary metal oxide semiconductor (CMOS) arrays, arrays combining both CCD and CMOS features, as well as hybrid infrared focal-plane arrays (IR-FPAs). Conventional arrays have light-sensing elements, typically referred to as "pixels" and readout circuitry that outputs signals indicative of the light sensed by the pixels.

A CMOS imager, for example, includes a focal plane array of pixel cells; each cell includes a photosensor (e.g., a photogate, photoconductor or a photodiode) overlying a substrate for producing a photo-generated charge in a doped region of the substrate. A readout circuit is provided for each pixel cell and typically includes at least a source follower transistor and a row select transistor for coupling the source follower transistor to a column output line. The pixel cell also typically has a floating diffusion region, connected to the gate of the source follower transistor. Charge generated by the photosensor is sent to the floating diffusion region. The imager may also include a transistor for transferring charge from the photosensor to the floating diffusion region and another transistor for resetting the floating diffusion region to a predetermined charge level prior to charge transference.

FIG. 1 illustrates a block diagram of a CMOS imager device 908 having a pixel array 200 with each pixel cell being constructed as described above, or as other known pixel cell circuits. Pixel array 200 comprises a plurality of pixels arranged in a predetermined number of columns and rows (not shown). The pixels of each row in array 200 are all turned on at the same time by a row select line, and the pixels of each column are selectively output by respective column select lines. A plurality of row and column lines are provided for the entire array 200. The row lines are selectively activated in sequence by a row driver 210 in response to row address decoder 220. The column select lines are selectively activated in sequence for each row activation by a column driver 260 in response to column address decoder 270. Thus, a row and column address is provided for each pixel.

The CMOS imager 908 is operated by a control circuit 250, which controls address decoders 220, 270 for selecting the appropriate row and column lines for pixel readout. Control circuit 250 also controls the row and column driver circuitry 210, 260 so that they apply driving voltages to the drive transistors of the selected row and column lines. The pixel output signals typically include a pixel reset signal $V_{rst}$ taken off of the floating diffusion region when it is reset by the reset transistor and a pixel image signal $V_{sig}$, which is taken off the floating diffusion region after photo-generated charges are transferred to it. The $V_{rst}$ and $V_{sig}$ signals are read by a sample and hold circuit 265 and are subtracted by a differential amplifier 267, to produce a differential signal $V_{rst}$-$V_{sig}$ for each pixel. $V_{rst}$-$V_{sig}$ represents the amount of light impinging on the pixels. This difference signal is digitized by an analog-to-digital converter 275. The digitized pixel signals are fed to an image processor 280 to form a digital image output. The digitizing and image processing can be located on or off the imager chip. In some arrangements the differential signal $V_{rst}$-$V_{sig}$ can be amplified as a differential signal and directly digitized by a differential analog to digital converter.

FIG. 2 illustrates a known four transistor (4T) CMOS imager pixel cell 102 and bias readout circuit 130 which may be utilized in pixel array 200. Pixel cell 102 includes a photodiode 110 connected to a transfer transistor 104. The transfer transistor 104 is also connected to floating diffusion region 108 which stores charge. A reset transistor 106 and a gate of source follower transistor 115 are connected to floating diffusion region 108. A row select transistor 119 is connected to source follower transistor 115. The active elements of pixel cell 102 perform the functions of (1) photon to charge conversion by photodiode 110; (2) resetting the floating diffusion region 108 to a known state before the transfer of charge to it by reset transistor 106; (3) transfer of charge to the floating diffusion region 108 by the transfer transistor 104; (4) selection of the cell 102 for readout by row select transistor 119; and (5) output and amplification of a signal representing a reset voltage (i.e., $V_{rst}$) and a pixel signal voltage (i.e., $V_{sig}$) based on the charges present on floating diffusion region 108 at reset and also after charge is transferred from photodiode 110 by source follower transistor 115.

When row select transistor 119 is turned on by a row select signal 118, source follower transistor 115 is connected to column readout line 116 which transfers the reset ($V_{rst}$) and pixel signal ($V_{sig}$) to a bias readout circuit 130. The bias readout circuit 130 contains a load transistor 120 which responds to bias voltage $V_{1n}$, and functions as a current source when utilized in conjunction with bias transistor 125. As a result, source follower transistor 115 provides a voltage level on line 116 that reflects or follows the voltage level on the gate of source follower transistor 115. The reset ($V_{rst}$) and pixel signal ($V_{sig}$) on line 116 are sampled and held, subtracted ($V_{rst}$-$V_{sig}$) to produce a signal representing incident light which is then digitized and processed by an image processor.

FIG. 3 illustrates a comparison chart between a gate voltage for source follower transistor 115 and its output voltage. As shown in FIG. 3, when the gate voltage is, for example, 2.8 volts, the maximum output voltage of the pixel 102 is approximately 1.4 volts. This is due to voltage drops inherent in the source follower 115 and row select 119 transistors. Thus, the maximum swing of the pixel output voltage is 1.4 volts. This dynamic signal range may be inadequate in some applications.

Accordingly, there is a need and desire for a pixel readout circuit that has an increased output voltage swing for a pixel output signal for a given level of gate voltage on the source follower transistor.

SUMMARY OF THE INVENTION

An exemplary embodiment of the present invention provides a new design for a column line bias readout circuit for use with an imager readout circuit in which a circuit which mirrors the pixel output transistor circuit is utilized. The mirror circuit is used in a circuit which increases a maximum output voltage swing on a column line for the pixel reset and signal voltages by replicating the gate voltage at the pixel output transistor and providing that as the pixel output signal.

BRIEF DESCRIPTION OF THE DRAWINGS

These and other features and advantages of the invention will be better understood from the following detailed description, which is provided in connection with the accompanying drawings, in which.

DETAILED DESCRIPTION OF THE INVENTION

In the following detailed description, reference is made to the accompanying drawings, which are a part of the specification, and in which is shown by way of illustration various embodiments whereby the invention may be practiced. These embodiments are described in sufficient detail to enable those skilled in the art to make and use the invention. It is to be understood that other embodiments may be utilized, and that structural, logical, and electrical changes, as well as changes in the materials used, may be made without departing from the spirit and scope of the present invention.

Figure 1:
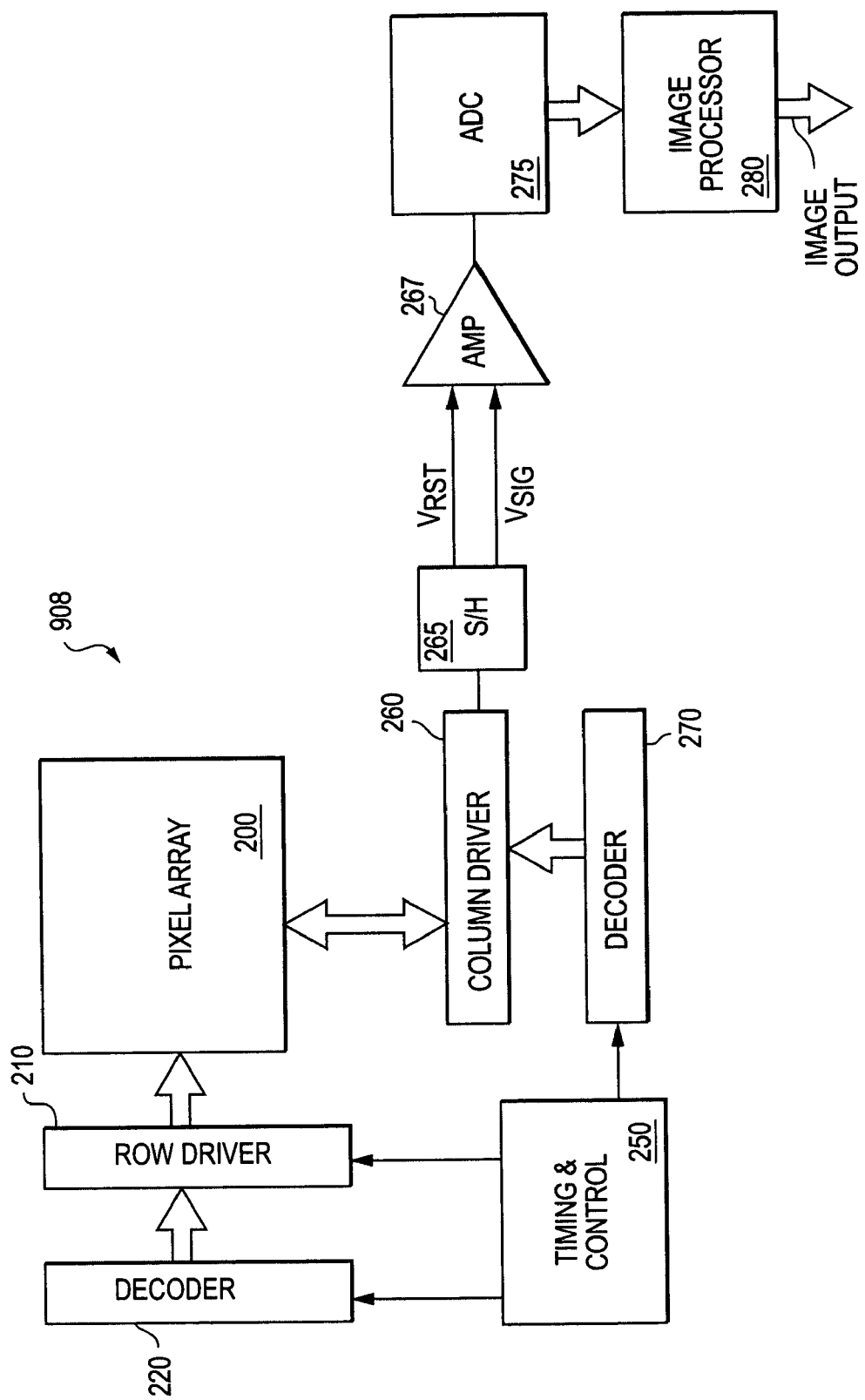
FIG. 1 is a block diagram of a conventional CMOS imager.

The term "pixel" refers to a photo-element unit cell containing a photo-conversion device or photosensor, for example, a photogate, photoconductor or a photodiode and transistors for operating the pixel and processing an electrical signal from electromagnetic radiation sensed by the photo-conversion device such as imager 908 (FIG. 1). The embodiments of pixels discussed herein are illustrated and described as employing four transistor (4T) pixel circuits for the sake of example only. It should be understood that the invention may be used with other pixel arrangements having more or less than four transistors.

Although the invention is described below with reference to a CMOS imager, the invention has applicability that is more general to solid state imaging devices having pixels. The following detailed description is, therefore, not to be taken in a limiting sense, and the scope of the present invention is defined only by the appended claims.

Figure 2:
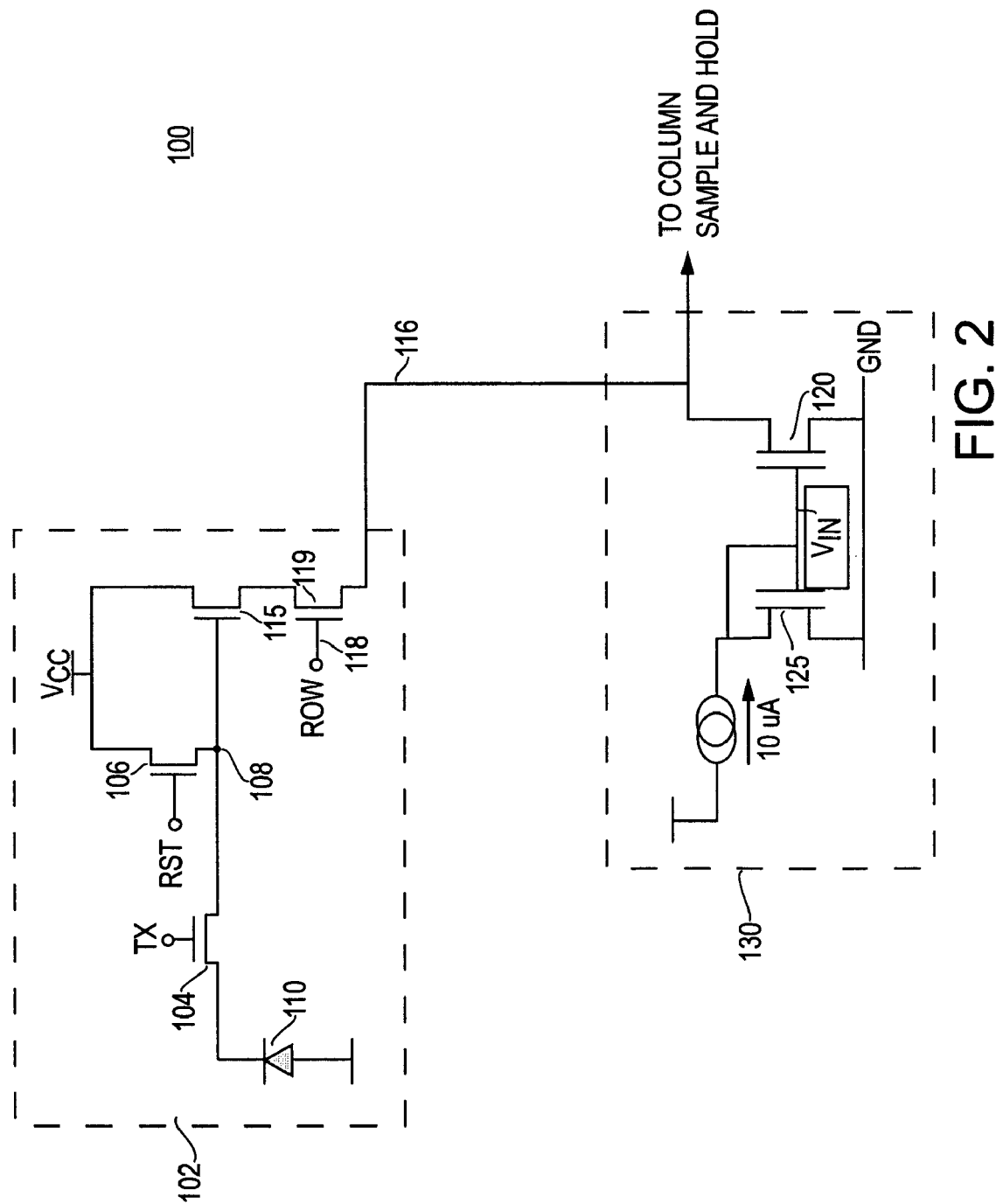
FIG. 2 is a schematic circuit diagram of a conventional imager pixel with readout circuitry.
Figure 3:
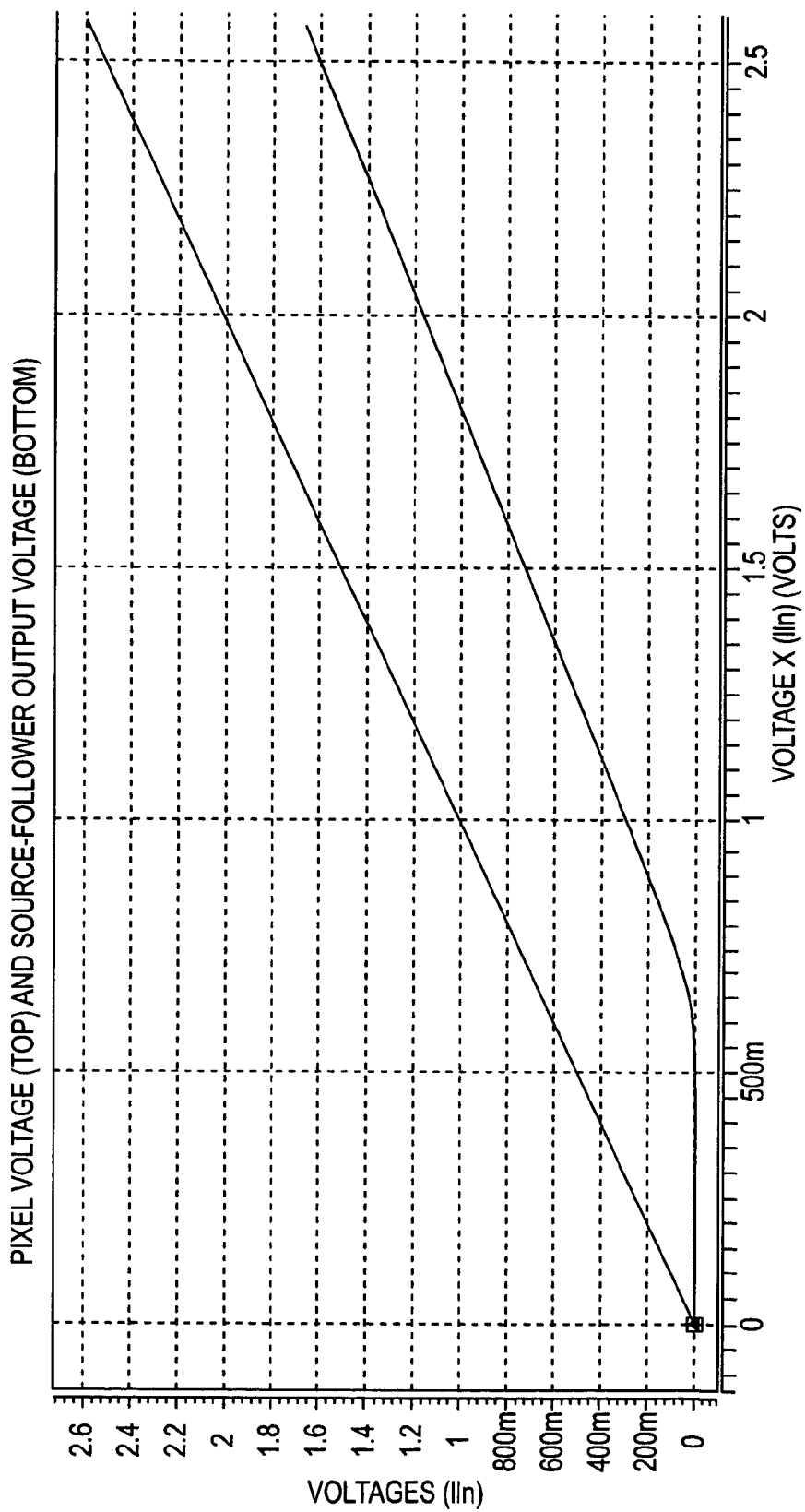
FIG. 3 is a graph comparing a photosensor voltage and a source follower transistor output voltage which is connected to the same photosensor.
Figure 4:
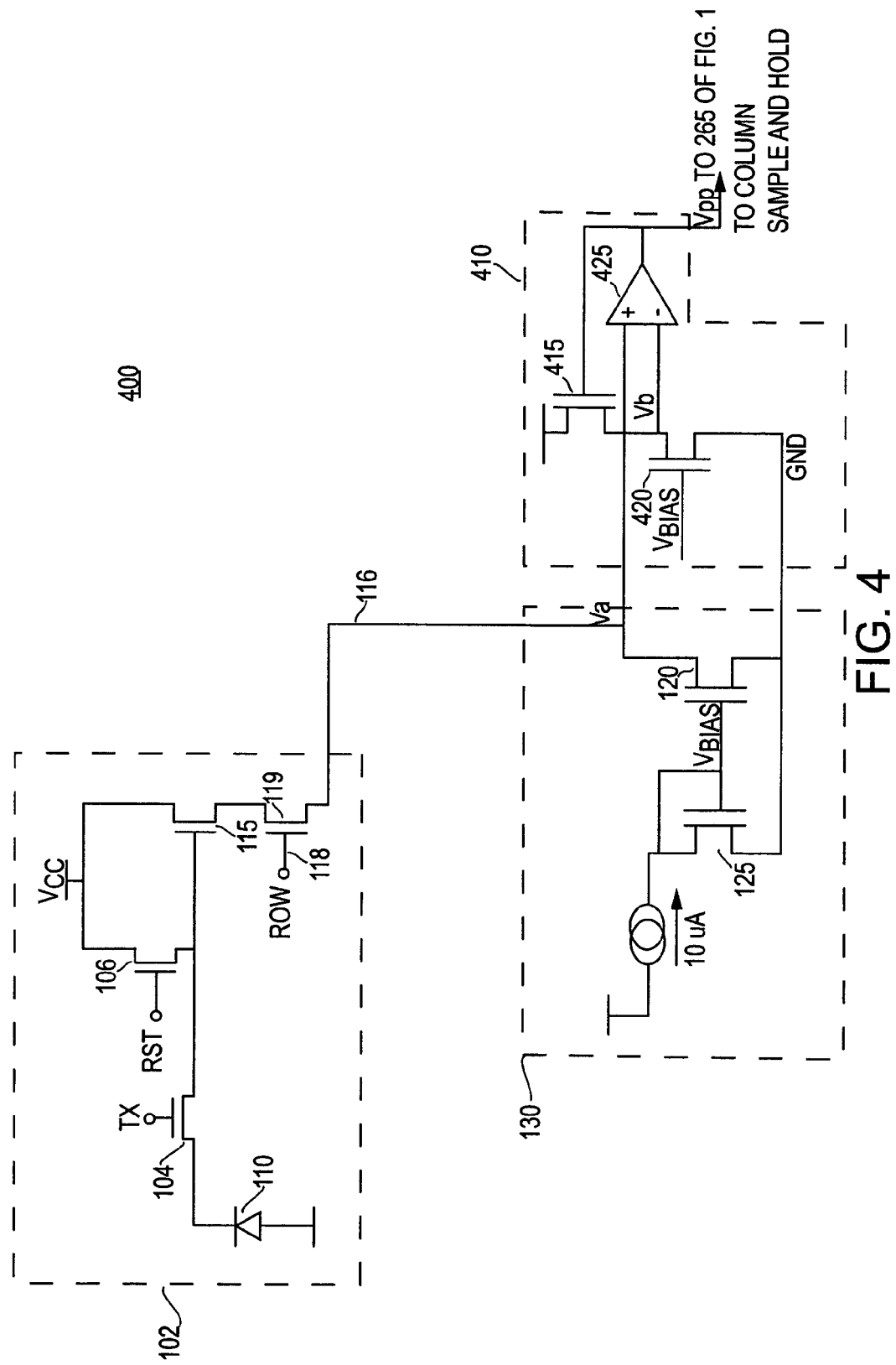
FIG. 4 is a schematic circuit diagram according to an exemplary embodiment of the invention.

FIG. 4 illustrates a pixel cell 102 and bias readout circuitry 130 and 410 according to an exemplary embodiment of the invention. Operation of the FIG. 2 and FIG. 4 circuits is similar; however, a bias readout circuit 410 is added to the FIG. 2 circuit and is connected between load transistor 120 and column sample and hold circuit 265 (FIG. 1). The circuit 410 includes transistors 415 and 420 which mirror the source follower 115 of pixel 102 and the bias transistor 120. Circuit 410 is utilized to provide an output signal for the column sample and hold circuit 265. Circuit 410 also includes an operational amplifier 425 with a first input that is coupled to the column readout line 116. A second input of operational amplifier 425 is coupled to a source of a mirror bias transistor 420. The output of operational amplifier 425 is coupled to the gate of tracking transistor 415, as well as to sample and hold circuit 265.

Circuit 410 replicates a biasing voltage associated with pixel cell 102 by configuring tracking transistor 415 and bias transistor 420 to mirror the source follower transistor 115 and load transistor 120. Operational amplifier 425 forces the first input to operational amplifier 425 to be equal to the second input to operational amplifier 425. Accordingly, voltage received at the gate of tracking transistor 415 tracks the voltage at the gate of source follower transistor 115.

To explain the operation of the circuit 410 mathematically, begin by assuming that the operational amplifier 425 has an open loop gain of A. The output of the amplifier 425, $V_{pp}$, is the voltage at the non-inverting input, $V_a$, subtracted from the voltage at the inverting input, $V_b$, multiplied by the open loop gain:

$$V_{pp}=(V_a-V_b)*A, \text{ or rearranging, } Vb=V_a-V_{pp}/A.$$

Given that A will typically be very large (greater than 1000) and that $V_{pp}$ will be in the order of 1 to 3 Volts, this means that $Vb=V_a$, and the output of circuit 410 tracks and is at approximately the same voltage as the gate voltage of pixel source follower transistor 115.

Figure 5:
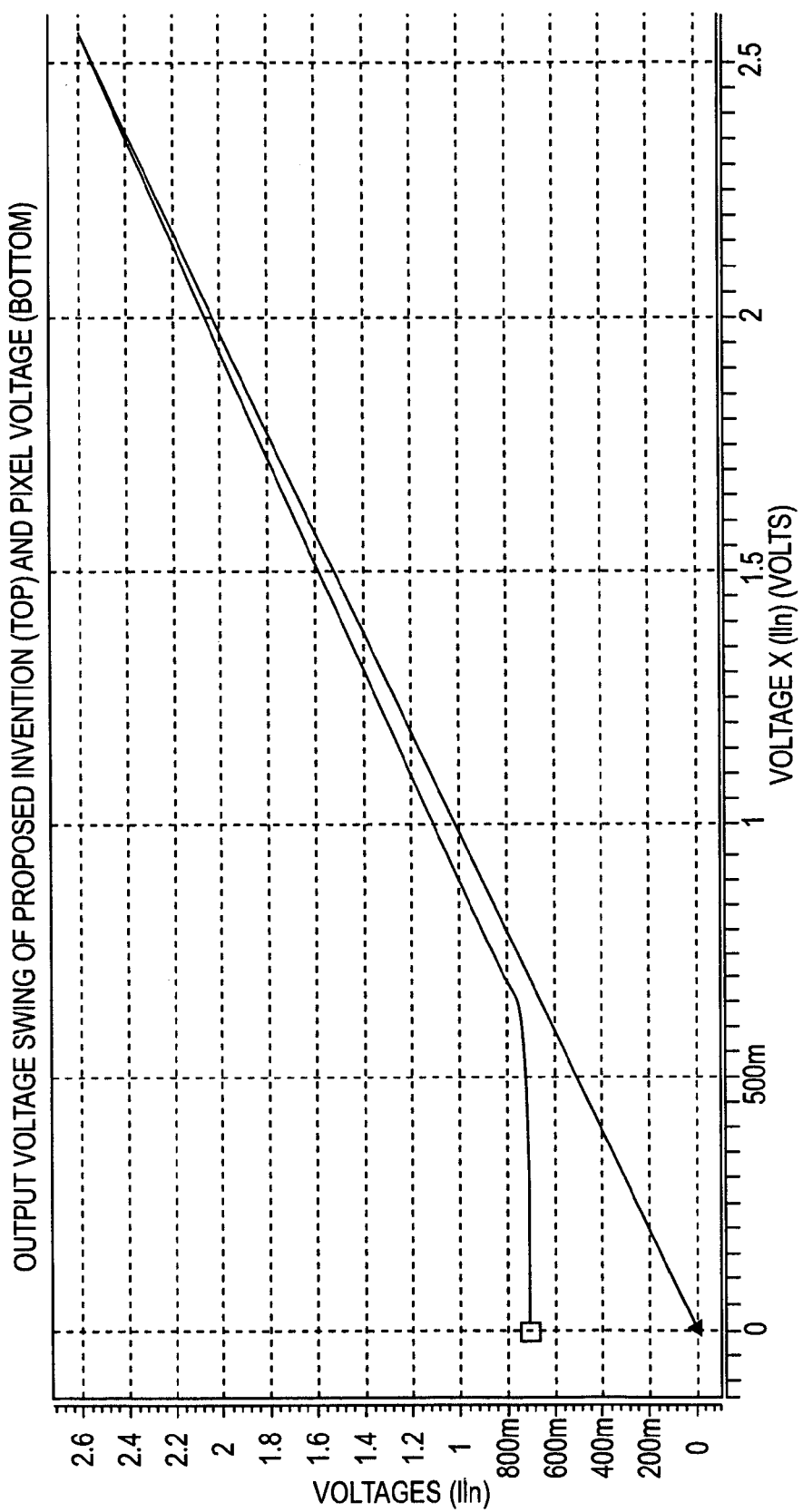
FIG. 5 is a graph comparing a photosensor voltage and a source follower transistor output voltage swing which is connected to the same photosensor according to an exemplary embodiment of the invention.

FIG. 5 illustrates graph showing a pixel output voltage swing for a pixel cell 102 utilizing a bias readout circuit 410 as part of the bias and readout circuit in comparison with a gate voltage of source follower transistor 115. Using circuit 410, the maximum pixel output voltage can be increased to more nearly approach the gate voltage of the source follower transistor 115. That is, for a given level of charge applied to the gate of source follower transistor 115, a larger output signal is supplied to the sample and hold circuit 265 than is supplied with the conventional circuit shown in FIG. 2.

It should be appreciated that other embodiments of the invention include a method of manufacturing the circuit 400 of the invention as illustrated in FIG. 4 and manufacturing an imaging device 908 (FIG. 6) employing the circuit 400. For example, in one exemplary embodiment, a method of fabricating an integrated circuit imaging device, comprises forming an array of pixels organized into a plurality of rows and columns, each column having a column line; forming a plurality of readout circuits; and forming at least one sample and hold circuit for storing reset and pixel signals obtained from the output from the associated readout circuit.

Figure 6:
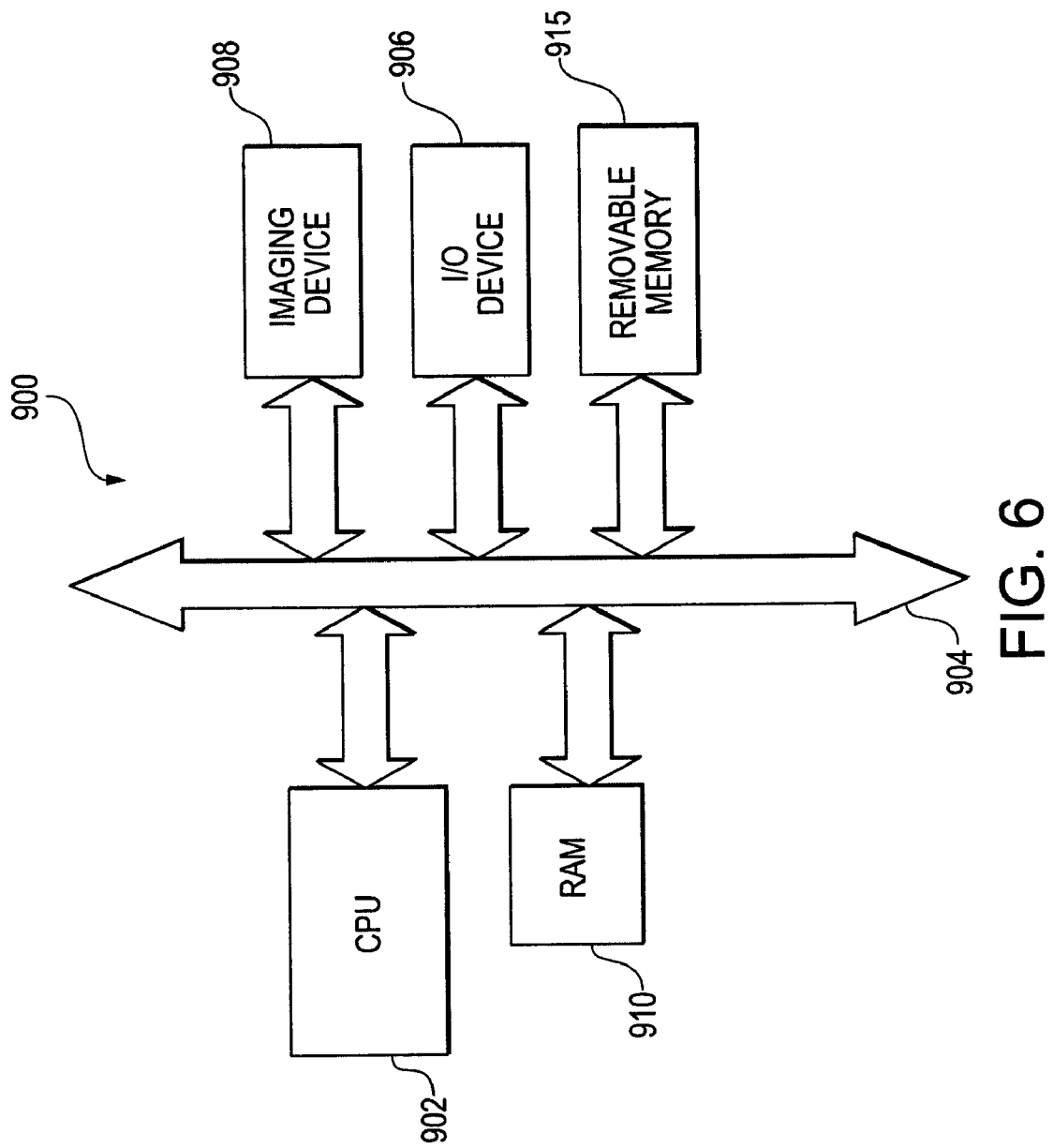
FIG. 6 is a diagram of a processing system employing an imager having an array of pixels connected to a readout circuit constructed in accordance with the exemplary embodiment of FIG. 4.

FIG. 6 illustrates a processor-based system 900 including an imaging device 908 of FIG. 1 in which the pixel readout circuit is modified to include the bias and readout circuits of the invention. The processor-based system 900 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

The processor-based system 900, for example a camera system, generally comprises a central processing unit (CPU) 902, such as a microprocessor, that communicates with an input/output (I/O) device 906 over a bus 904. Imaging device 908 also communicates with the CPU 902 over bus 904. The processor-based system 900 also includes random access memory (RAM) 910, and can include removable memory 915, such as flash memory, which also communicate with CPU 902 over the bus 904. Imaging device 908 of the type illustrated in FIG. 1, but modified to include the bias and readout circuit shown in the exemplary embodiment of FIG. 4 may be combined with a processor, such as a CPU, digital signal processor, or microprocessor, with or without memory storage on a single integrated circuit or on a different chip than the processor.

The devices described above illustrate typical devices of many that could be used. The above description and drawings illustrate embodiments, which achieve the objects, features, and advantages of the present invention. Various embodiments of the invention have been illustrated using a photodiode as the charge conversion device, and in the environment of a four transistor pixel. However, it should be appreciated that the invention is not so limited and can be used in any pixel architecture employing a bias and readout circuit to read a charge converted output signal from a pixel. In addition, other types of photosensors may be used to generate image charge. Accordingly, it is not intended that the present invention be strictly limited to the above-described and illustrated embodiment. Any modifications, though presently unforeseeable, of the present invention that comes within the spirit and scope of the following claims should be considered part of the present invention.

What is claimed as new and desired to be protected by Letters Patent of the United States is:

1. A pixel readout circuit comprising:
   a readout line coupled to receive a pixel output voltage on an output line which varies within a first signal range; and
   a pixel output signal modifying circuit coupled to said output line for producing a pixel output voltage which varies in a second signal range different from said first signal ranges,
   wherein said pixel output modifying circuit comprises an amplifier for providing an output voltage and having a first input coupled to said output line, a first transistor connected to a second input of said amplifier and having a gate for receiving a bias voltage, and a second transistor having a gate connected to the output of said amplifier and an output connected to said second input of said amplifier.

2. The circuit of claim 1, wherein said second signal range is larger than said first signal range.

3. The circuit of claim 1, wherein said readout line is connected to a bias transistor, and said pixel output voltage is generated by a source follower transistor within a pixel which is coupled to said output line, said first and second transistors being arranged to mirror the arrangement of said source follower and bias transistors.

4. The circuit of claim 1, wherein said pixel output signal modifying circuit provides an output signal which varies in response to a signal on said column line.

5. A column readout circuit comprising:
   a readout line coupled to receive a pixel output voltage which varies in a first signal range; and
   a pixel output signal modifying circuit coupled to said output line for producing a pixel output voltage which varies in a second signal range which is larger than said first signal range;
   a column sample and hold circuit for receiving the output of said pixel output signal modifying circuit;
   an amplifier for providing an output voltage and having a first input couple to said output line;
   a first transistor connected to a second input of said amplifier and having a gate for receiving a bias voltage; and
   a second transistor having a gate connected to the output of said amplifier and an output connected to said second input of said amplifier,
   wherein said readout line is connected to a bias transistor, and said pixel output voltage is generated by a source follower transistor within a pixel which is coupled to said output line, said first and second transistors being arranged to mirror the arrangement of said source follower and bias transistors.

6. The circuit of claim 5, wherein said pixel output signal modifying circuit provides an output signal which varies in response to a signal on said column line.

7. An imaging system comprising:
   a processor;
   an imaging device comprising an array of pixels coupled to said processor, said imaging device comprising:
      a column readout line coupled to receive a pixel output voltage which varies in a first signal range;
      a pixel output signal modifying circuit coupled to said output line for producing a pixel output voltage which varies in a second signal range which is larger than said first signal range; and
      a column sample and hold circuit for receiving the output of said pixel output signal modifying circuit,
   wherein said pixel output signal modifying circuit comprises an amplifier for providing an output voltage and having a first input couple to said output line, a first transistor connected to a second input of said amplifier and having a gate for receiving a bias voltage, and a second transistor having a gate connected to the output of said amplifier and an output connected to said second input of said amplifier.

8. The system of claim 7, wherein said pixel output signal modifying circuit provides an output signal which varies in response to a signal on said column line.

9. The system of claim 7, wherein said readout line is connected to a bias transistor, and said pixel output voltage is generated by a source follower transistor within a pixel which is coupled to said output line, said first and second transistors being arranged to mirror the arrangement of said source follower and bias transistors.

10. A pixel readout circuit comprising:
    a pixel source follower transistor for receiving a pixel signal at a gate thereof and producing a pixel output signal;
    a pixel output modifying circuit coupled to receive said pixel output signal and to output a modified signal representing the pixel signal at the source follower gate, the modified signal being larger than the pixel output signal, said output modifying circuit comprising at least one tracking transistor in a feedback circuit between an output and a first input of an operational amplifier, said operational amplifier receiving said pixel output signal at a second input; and
    a first bias transistor coupled to said source follower transistor and a second bias transistor coupled to said tracking transistor such that said tracking transistor and second bias transistor mirror the circuit arranged of the source follower transistor and first bias transistor.

11. The pixel circuit of claim 10, wherein said operational amplifier, tracking transistor and second bias transistor operate to produce at said second input a signal of substantially equal magnitude to said pixel output signal which is applied to said first input.

12. A method of forming an integrated circuit, said method comprising the acts of:
    forming a first transistor comprising a gate which receives a pixel signal;
    forming a second transistor for providing a bias current for operation of the first transistor; and
    forming a signal modifying circuit comprising at least a third transistor, an operational amplifier, and a fourth transistor for providing a bias current for said third transistor, wherein said operational amplifier is arranged to receive at respective inputs thereof an output signal from the first transistor and a source signal from the third transistor and to output a modified signal which is applied to a gate of said third transistor.

13. A method of forming an integrated circuit imaging device, the method comprising the acts of:
- forming an array of pixels organized into a plurality of rows and columns, each column having a column line, each pixel comprising:
- a photosensor for generating charges in response to light,
- a storage region for storing the accumulated charges,
- a transfer transistor connected between the photosensor and the storage region,
- a source follower transistor having a gate connected to the storage region, said gate receiving an associated gate voltage, and
- a row select transistor connecting an output terminal of the source follower transistor to an output line;
- forming a first current bias circuit coupled to said output line;
- forming a signal modifying circuit comprising:
  - an operation amplifier adapted to receive at a first input thereof a signal on the output line, and
  - a mirror transistor which mirrors said source follower transistor, wherein a second input of the operational amplifier is coupled to a source of the mirror transistor and wherein an output of the operational amplifier provides a modified pixel output signal which is applied to the gate of the mirror transistor; and
- forming a second current bias circuit coupled to the source of the mirror transistor.

14. The method of claim 13, further comprising the act of forming sample and hold circuitry for receiving the modified output signal.

15. An imager device comprising:
- a pixel comprising a photosensor for photo-generating charge in response to incident light and a first transistor for providing a pixel output signal representing said photo-generated charge onto a column output line;
- a second transistor for providing a bias current on said output line in response to a gate bias signal; and
- an amplifier circuit for providing an amplified pixel output signal, said amplifier circuit comprising an amplifier coupled to said output line, a third transistor, and a fourth transistor, said third and fourth transistors being configured to mirror operation of said first and second transistors.

16. A method of operating on imager device, comprising:
- photo-generating charge, via a photosensor, in response to incident light;
- gating a pixel output signal onto a column output line, via a first transistor, said pixel output signal representing said photo-generated charge;
- gating a bias current, via a second transistor, onto said output line in response to a gate bias signal; and
- generating an amplified pixel output signal, via an amplifier circuit, said amplifier circuit comprising an amplifier coupled to said output line, a third transistor, and a fourth transistor, said third and fourth transistors being configured to mirror operations of said first and second transistors.

* * * * *

UNITED STATES PATENT AND TRADEMARK OFFICE
CERTIFICATE OF CORRECTION

PATENT NO. : 7,477,306 B2 Page 1 of 1
APPLICATION NO. : 10/927121
DATED : January 13, 2009
INVENTOR(S) : Neaves It is certified that error appears in the above-identified patent and that said Letters Patent is hereby corrected as shown below:

In column 5, line 23, in Claim 1, delete "ranges," and insert -- range, --, therefor.

Signed and Sealed this

Fourteenth Day of April, 2009

JOHN DOLL
*Acting Director of the United States Patent and Trademark Office*